(12) United States Patent
Dankbaar et al.

(10) Patent No.: US 9,528,645 B2
(45) Date of Patent: Dec. 27, 2016

(54) DEVICE FOR COUPLING A TUBE TO A HOUSING

(75) Inventors: Frank Dankbaar, Mullsjo (SE); Anders Gronhage, Mullsjo (SE)

(73) Assignee: Kongsberg Automotive AB, Mullsjö (SE)

( * ) Notice: Subject to any disclaimer, the term of this patent is extended or adjusted under 35 U.S.C. 154(b) by 37 days.

(21) Appl. No.: 13/988,484

(22) PCT Filed: Nov. 19, 2010

(86) PCT No.: PCT/IB2010/002972
§ 371 (c)(1),
(2), (4) Date: May 20, 2013

(87) PCT Pub. No.: WO2012/066373
PCT Pub. Date: May 24, 2012

(65) Prior Publication Data
US 2013/0240048 A1    Sep. 19, 2013

(51) Int. Cl.
*F16L 37/092* (2006.01)
*F16L 37/091* (2006.01)

(52) U.S. Cl.
CPC ............ *F16L 37/092* (2013.01); *F16L 37/091* (2013.01); *Y10T 137/0402* (2015.04); *Y10T 137/598* (2015.04)

(58) Field of Classification Search
CPC .. F16L 37/0925; F16L 37/096; F16L 37/0982; F16L 37/0985; F16L 37/0987

(Continued)

(56) References Cited

U.S. PATENT DOCUMENTS 3,743,326 A    7/1973    Courtot et al.
4,005,883 A    2/1977    Guest
(Continued)

FOREIGN PATENT DOCUMENTS

EP    0247214 A1    12/1987
EP    0558844 A1    8/1993
(Continued)

OTHER PUBLICATIONS

English language abstract and computer-generated-assisted translation for JPH08178157A extracted from espacenet.com on Jan. 27, 2015, 35 pages.

*Primary Examiner* — David E Bochna
(74) *Attorney, Agent, or Firm* — Howard & Howard Attorneys PLLC (57) ABSTRACT

A device for receiving or providing a fluid and a method of selectively coupling a tube (22) to the device with the tube receiving or providing the fluid. The device includes a housing (24) and a female port (26) extending from the housing. The female port has an engagement surface (28) and defines an interior chamber (30) with a retainer (62) disposed in the interior chamber. The retainer has a base (64), a finger (66) extending from the base to selectively engage the engagement surface, and a barb (88) proximate to the finger for selectively engaging the tube. A seal (52) is disposed in the interior chamber of the female port adjacent the retainer. The retainer (90) has a stud extending from the base beyond the barb to engage the seal for biasing the retainer away from the housing to facilitate movement of the finger against the engagement surface and engagement of the tube with the barb.

22 Claims, 6 Drawing Sheets

(58) Field of Classification Search
USPC .............. 285/322, 323, 324, 307, 315, 316
See application file for complete search history.

(56) References Cited

U.S. PATENT DOCUMENTS

| | | | |
|---|---|---|---|
| 4,219,222 A * | 8/1980 | Brusadin ..................... | 285/319 |
| 4,696,495 A * | 9/1987 | Oliver ......................... | 285/319 |
| 4,836,580 A | 6/1989 | Farrell | |
| 4,903,942 A * | 2/1990 | Licciardello et al. ........ | 285/315 |
| 5,230,539 A * | 7/1993 | Olson ................ | F16L 37/0925 |
| | | | 285/243 |
| 5,474,336 A | 12/1995 | Hoff et al. | |
| 5,584,513 A | 12/1996 | Sweeney et al. | |
| 5,933,556 A | 8/1999 | Hawkins | |
| 6,349,978 B1 * | 2/2002 | McFarland et al. ......... | 285/322 |
| 7,380,838 B2 | 6/2008 | Paluncic | |
| 7,434,847 B2 | 10/2008 | Densel et al. | |
| 7,448,655 B2 * | 11/2008 | Le Bars ....................... | 285/323 |
| 2004/0108712 A1 * | 6/2004 | Liang .......................... | 285/322 |
| 2005/0121909 A1 * | 6/2005 | Densel et al. ............... | 285/322 |
| 2011/0012350 A1 * | 1/2011 | Camozzi et al. ............ | 285/348 |
| 2012/0080880 A1 * | 4/2012 | Nakamura ................... | 285/317 |

FOREIGN PATENT DOCUMENTS

| | | | |
|---|---|---|---|
| FR | 2405417 A1 | 5/1979 | |
| JP | 58-155475 U | 10/1983 | |
| JP | S61-4796 Y | 2/1986 | |
| JP | 7145895 A | 6/1995 | |
| JP | H08-178157 A | 7/1996 | |
| JP | 2000310384 A | 11/2000 | |
| WO | 0138771 A1 | 5/2001 | |
| WO | 2005057066A2 A2 | 6/2005 | |

* cited by examiner

DEVICE FOR COUPLING A TUBE TO A HOUSING

RELATED APPLICATIONS

This application is the National Stage of International Patent Application No. PCT/IB2010/002972, filed on Nov. 19, 2010, the disclosure of which is specifically incorporated by reference.

BACKGROUND OF THE INVENTION

1. Field of the Invention

The subject invention generally relates to a device for receiving or providing a fluid with a tube coupled to the device for receiving or providing the fluid.

2. Description of Related Art

Many industries having fluid transportation applications strive for the ability to quickly attach and likewise disassemble a tube with another mechanical apparatus. Certain industries utilize quick connect fittings as opposed to swaging metallic pipes. Many different quick connect fittings have been developed over the years. One type of quick connect fitting includes a connection port with a plastic or metallic collet disposed within the connection port along a central axis. The tube is selectively coupled to the connection quick connect fitting. Commonly, the collet includes wedges which engage an exterior of the tube when the collet moves in a first direction along the central axis. In other words, the collet is pulled back forcing the collet to follow ramps within the connection port that move the wedges into engagement with the exterior of the tube. To remove the tube, the collet is pushed in a second direction toward the connection port forcing the collet to follow ramps within the connection port that move the wedges out of engagement with exterior of the tube. An example of such a fitting is disclosed in European Patent No. 0 247 214 and U.S. Pat. No. 5,584,513.

Wedges of the collets can become disengaged from the tube when the tube is bumped or through vibrations during operation. It is important that the collet remains engaged with the tube in operation to ensure that the tube remains connected to the port. In addition, it is desirable to develop a device that is low in cost to produce and requires fewer parts. Therefore, there remains an opportunity to develop a device that maintains engagement of a finger with a tube until a user desires to remove the tube that is formed of relatively few parts and is inexpensive to manufacture.

SUMMARY OF THE INVENTION AND ADVANTAGES

The subject invention provides for a device for receiving or providing a fluid with a tube coupled to the device for receiving or providing the fluid. The device includes a housing and a female port extending from the housing along an axis. The female port has an engagement surface and defines an interior chamber. The device further includes a retainer disposed in the interior chamber of the female port. The retainer has a base, a finger extending from the base to selectively engage the engagement surface, and a barb proximate to the finger for selectively engaging the tube. The device also includes a seal disposed in the interior chamber of the female port adjacent the retainer. The retainer has a stud extending from the base along the axis beyond the barb to engage the seal for biasing the retainer away from the housing along the axis to facilitate movement of the finger against the engagement surface and engagement of the barb with the tube.

Additionally, the subject invention provides for a method of selectively coupling the tube to the device. The method includes the steps of moving the retainer toward the housing along the axis to an unlocked position, engaging the front side of the finger with the first abutment when in the unlocked position, and engaging the stud with the seal to bias the retainer away from the housing. The method further includes the steps of inserting the tube through the retainer and the seal, moving the retainer away from the housing along the axis to a locked position, engaging the barb with the tube to secure the tube in the retainer, biasing the retainer away from the housing when in the locked position through the engagement of the stud with the seal, and engaging the back side of the finger with the second abutment when in the locked position to maintain engagement of the barb with the tube.

Accordingly, the subject invention provides for a device that allows quick engagement and release of a tube with a housing and a retainer for maintaining engagement with the tube until a user desires to remove the tube.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF THE INVENTION

Figure 1:
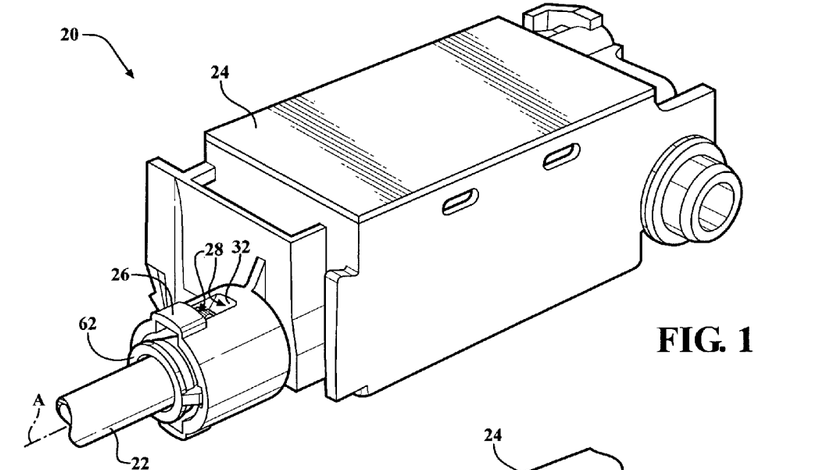
FIG. 1 is a perspective view of a device including a housing, a female port extending from the housing and a tube coupled to the female port.
Figure 2:
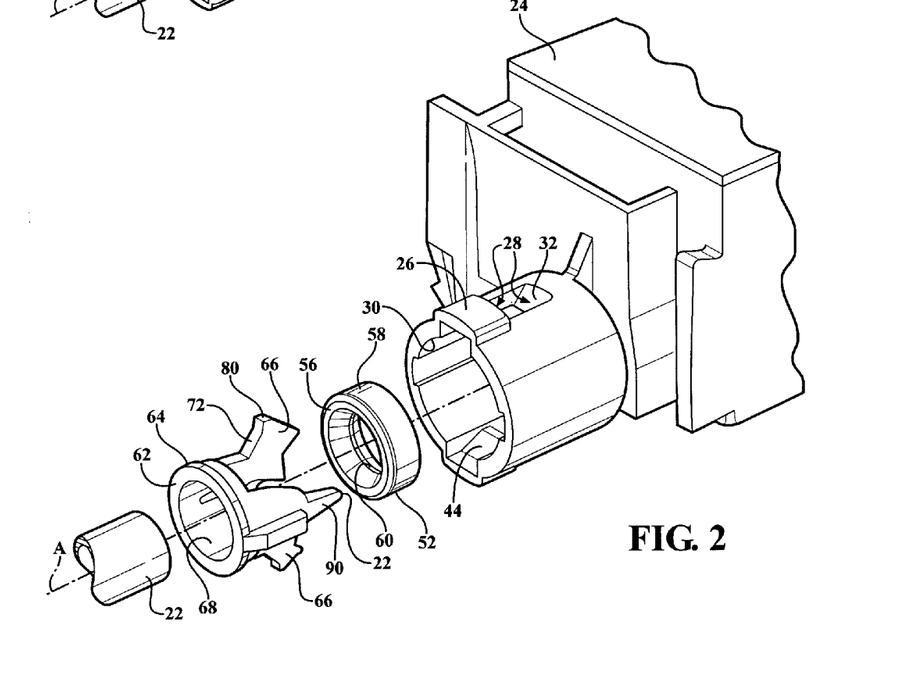
FIG. 2 is an exploded view the device including the tube, a retainer and a seal.

Referring to the Figures, wherein like numerals indicate like or corresponding parts throughout the several views, a device 20 for receiving or providing a fluid is generally shown in FIGS. 1 and 2. More specifically, a tube 22 is coupled to the device 20 for receiving or providing the fluid. The tube 22 can be of any suitable material or configuration. As non-limiting examples, the tube 22 can be formed of polyvinyl chloride (PVC), polyurethane (PU), or thermoplastic polyurethane (TPU) materials. The fluid can be a gas, a liquid, and/or any other suitable fluid.

The device 20 includes a housing 24 for receiving or providing the fluid. In other words, the fluid is transported into or out of the housing. It is to be appreciated that the housing 24 can be any suitable configuration for receiving or providing the fluid. For example, the housing 24 can be a valve housing having pneumatic valves for regulating flow of the fluid for use in a variety of applications. Furthermore, the housing 24 can be formed of any type of metallic material, polymer material, composite material, and/or any other suitable material.

The device 20 further includes a female port 26 extending from the housing 24 along an axis A. The female port 26 can be integral with the housing 24 or attached to the housing 24 by any suitable mechanism, such as, for example, fasteners, welding, and/or adhesive, etc. As best shown in FIG. 2 and the operational views of FIGS. 4-10, the female port 26 has an engagement surface 28 and defines an interior chamber 30. The female port 26 also defines a window 32 disposed radially relative to the axis A with the engagement surface 28 defining the window 32. The window 32 intersects the interior chamber 30 of the female port 26.

The engagement surface 28 is further defined as a first abutment 34 and a second abutment 36 spaced from each other. The first abutment 34 includes a first ramp 38 and the second abutment 36 includes a second ramp 40. The first ramp 38 extends to a first corner 42 which can define a flat configuration, an arcuate configuration, or any other suitable configuration. The first abutment 34 and the first corner 42 will be discussed further below. It is to be appreciated that the first and second ramps 38, 40 can be angled at any suitable degree relative to the axis A.

The female port 26 also includes an entrance ramp 44 adjacent to the second ramp 40 with the entrance ramp 44 sloping inwardly towards the axis A. In other words, the entrance ramp 44 slopes inwardly to become progressively closer to the axis A as the entrance ramp 44 approaches the housing 24. The entrance ramp 44 and the second ramp 40 meet to define a second corner 46. The second corner 46 can define a flat configuration, an arcuate configuration, or any other suitable configuration.

The female port 26 further includes an inner wall 48 and a shoulder 50 adjacent the inner wall 48 within the interior chamber 30. The inner wall 48 is also adjacent the first ramp 38 and more specifically the inner wall 48 and first ramp 38 meet at the first corner 42. Additionally, the shoulder 50 extends radially toward the axis A and is spaced from the first and second ramps 38, 40.

The device 20 also includes a seal 52 disposed within the interior chamber 30 of the female port 26. The seal 52 includes a first side 54 and a second side 56 spaced from each other along axis A with the first side 54 engaging the female port 26. More specifically, the seal 52 abuts the shoulder 50 of the female port 26 and even more specifically, the first side 54 of the seal 52 abuts the shoulder 50. The seal 52 further includes an outer surface 58 adjacent the first and second sides 54, 56 for abutting the inner wall 48. The seal 52 defines a hole 60 through the first and second sides 54, 56 along the axis A for receiving the tube 22. In one embodiment, the seal 52 includes a first inner surface and a second inner surface each adjacent the hole 60. The first and second inner surfaces are sloped to define a cross sectional profile having a wedge configuration. The wedge configuration reduces a contact area of the seal 52 with the tube 22 for allowing easy insertion of the tube 22 while still providing a tight seal 52 on the tube 22. In other words, the hole 60 of the seal 52 and the tube 22, as well as the outer surface 58 and the inner wall 48, create a tight fit for preventing the fluid from leaking into the interior chamber 30.

Figure 3:
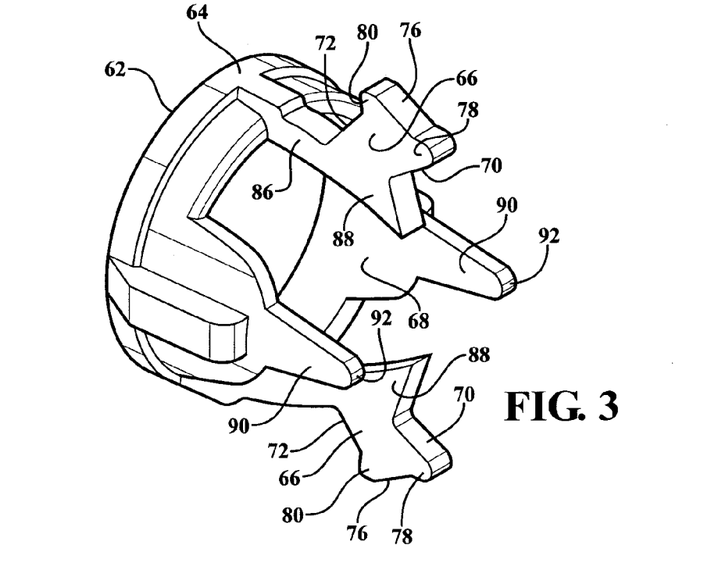
FIG. 3 is a perspective view of the retainer.
Figure 4:
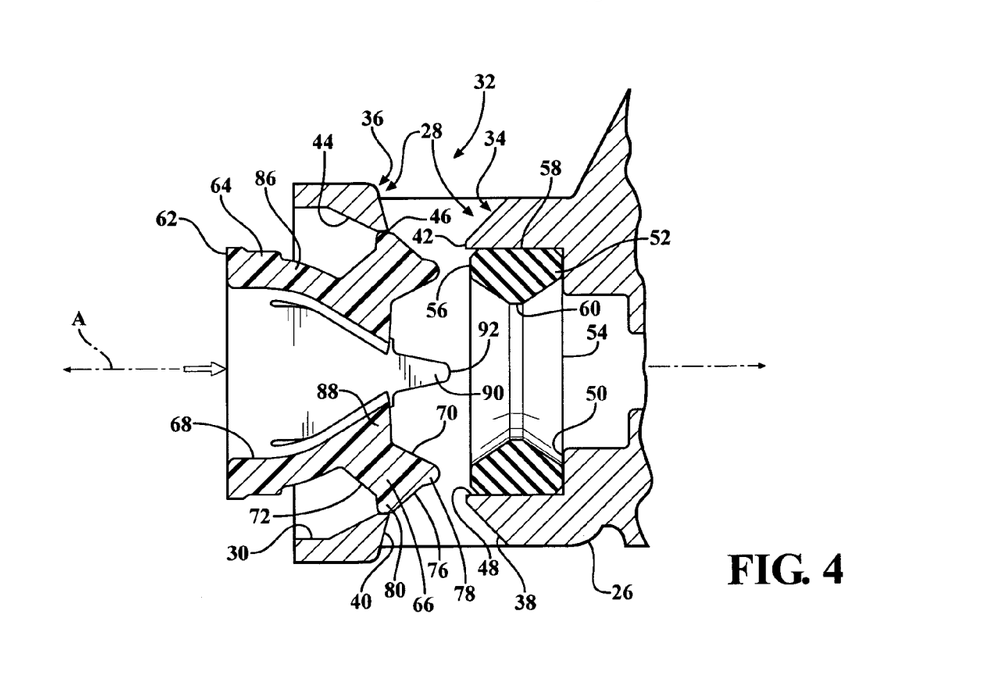
FIG. 4 is a cross-sectional view of the female port, the retainer and the seal with the retainer being inserted into the female port such that a finger on the retainer engages an entrance ramp on the female port.
Figure 5:
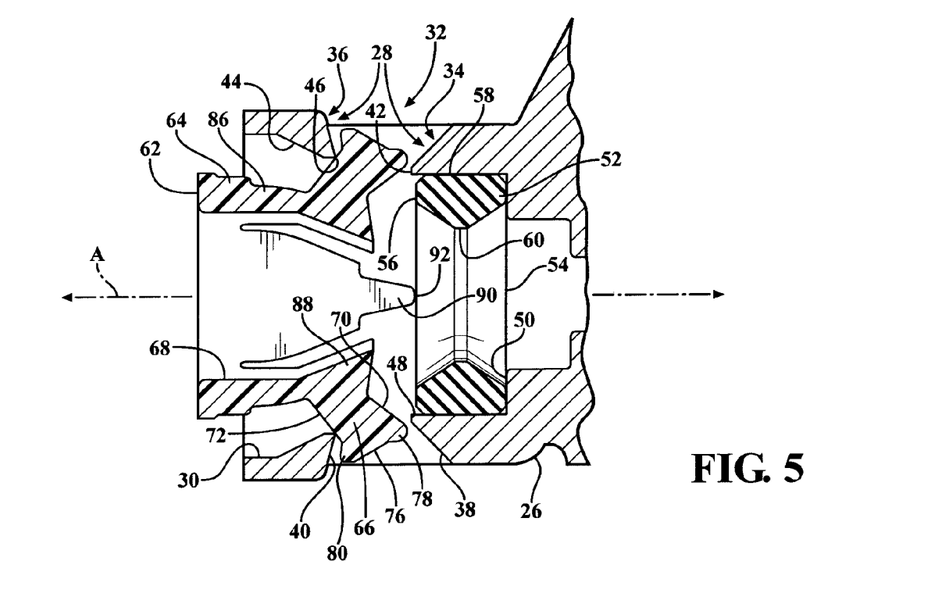
FIG. 5 is a cross-sectional view of the female port, the retainer and the seal with the finger engaging a second abutment of the female port in a locked position.
Figure 6:
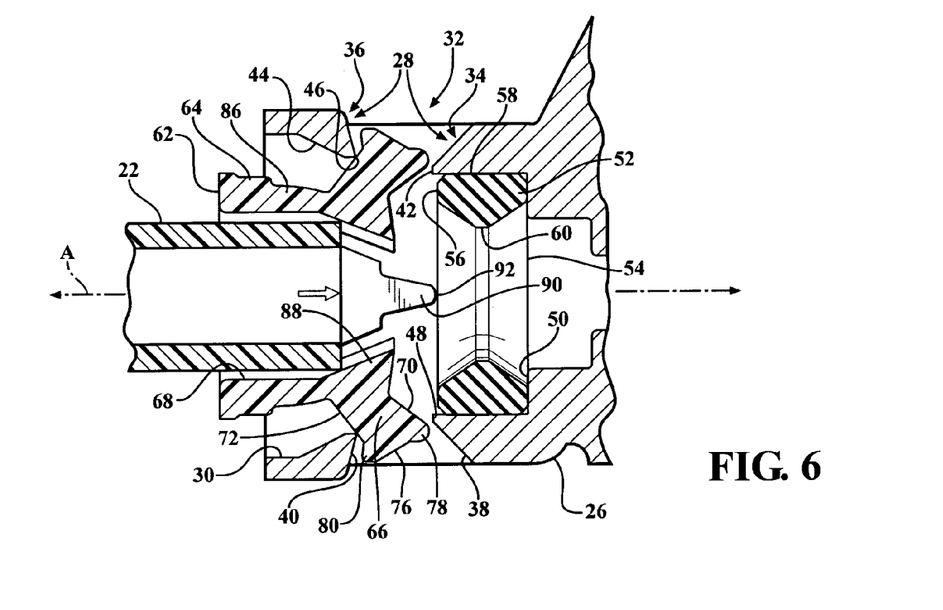
FIG. 6 is a cross-sectional view of the female port, the retainer and the seal along with a tube disposed in the retainer with the retainer in the locked position.
Figure 7:
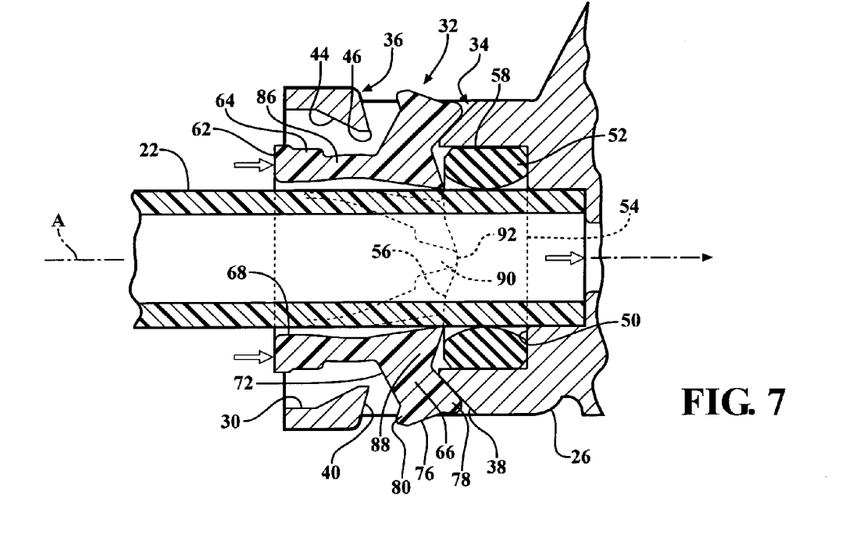
FIG. 7 is a cross-sectional view of the female port, the retainer, the seal and the tube with the finger engaging a first abutment of the female port, the retainer compressing the seal when the retainer is in an unlocked position.
Figure 8:
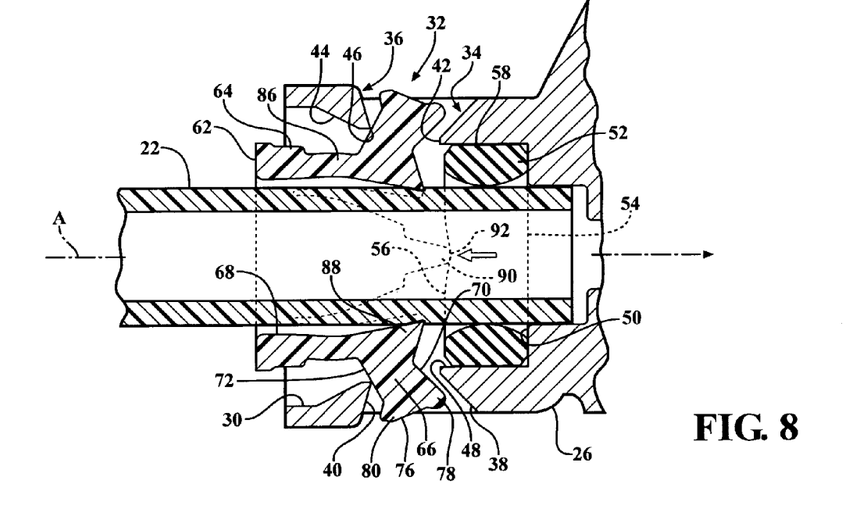
FIG. 8 is a cross-sectional view of the female port, the retainer, the seal and the tube with the finger engaging the second abutment and the barb engaging the tube when the retainer is in a locked position.

The device 20 further includes a retainer 62 disposed in the interior chamber 30 of the female port 26 with the seal 52 adjacent the retainer 62. As also shown in FIG. 3, the retainer 62 includes a base 64 and a finger 66 extending from the base 64 to selectively engage the engagement surface 28. The retainer 62 defines an aperture 68 extending through the base 64 along the axis A for receiving the tube 22. The finger 66 further includes a front side 70 and a back side 72 spaced from each other with the front side 70 engaging the engagement surface 28 when in an unlocked position and the back side 72 engaging the engagement surface 28 in a locked position, as shown in FIGS. 7 and 8 respectively. As orientated in the drawings, the front side 70 is closer to the housing 24 than the back side 72. More specifically, the front side 70 engages the first abutment 34 when in the unlocked position and the back side 72 engages the second abutment 36 when in the locked position. Even more specifically, the front side 70 of the finger 66 engages the first ramp 38 in the unlocked position and the back side 72 of the finger 66 engages at least an end of the second ramp 40 in the locked position. Further, the front side 70 of the finger 66 engages the first corner 42 when in the unlocked position and the back side 72 of the finger 66 engages the second corner 46 when in the locked position. The second corner 46 at least partially defines the end of the second ramp 40. The retainer 62 is maintained within the interior chamber 30 by the entrance ramp 44 sloping inwardly toward the axis A. More specifically, the retainer 62 is maintained within the interior chamber 30 by the second corner 46.

The window 32 of the female port 26 receives the finger 66. The window 32 is further defined as a plurality of windows 32 spaced from each other. In one embodiment, the plurality of windows 32 are spaced 180 degrees apart from each other. The finger 66 is further defined as a plurality of fingers 66 spaced from each other with the fingers 66 disposed in respective windows 32. In certain embodiments, the fingers 66 are spaced 180 degrees apart from each other.

The finger 66 extends to a distal end 76 having a first lobe 78 and a second lobe 80 spaced from each other. The first lobe 78 is adjacent the front side 70 of the finger 66 and the second lobe 80 is adjacent the back side 72 of the finger 66. At least one of the lobes selectively engages the engagement surface 28, and more specifically, the first and/or second ramp 38, 40. The first lobe 78 engages the first ramp 38 in the unlocked position. The first lobe 78 defines a rounded surface such that the finger 66 engages the first ramp 38. It is to be appreciated that the rounded surface can be any suitable configuration. The second lobe 80 defines a flat surface that engages the entrance ramp 44 and the second corner 46 such that the finger 66 engages the entrance ramp 44. It is to be appreciated that the flat surface can be any suitable configuration. In addition, the flat surface and the rounded surface are spaced from each other.

The retainer 62 further includes a living hinge 86 disposed between the base 64 and the finger 66 for allowing the finger 66 to move radially relative to the axis A. It is to be appreciated that the living hinge 86 has any width or depth for allowing the finger 66 to bias as desired.

The retainer 62 further includes a barb 88 proximate to the finger 66 for selectively retaining the tube 22. In one embodiment, the barb 88 is integrally formed with the finger 66 such that the barb 88 moves away from the axis A when the front side 70 of the finger 66 engages the first abutment 34 for allowing removal of the tube 22 and the barb 88 moves toward the axis A when the back side 72 of the finger 66 engages the second abutment 36 for securing the tube 22 in the retainer 62. The barb 88 is further defined as a plurality of barbs 88 spaced from each other with each of the barbs 88 proximate to respective fingers 66. Furthermore, in one embodiment, each of the barbs 88 are integrally formed on respective fingers 66. It is to be appreciated that the barbs 88 can be coupled to the finger 66 by adhesive, welding, fasteners, and/or any other suitable means. It is to be appreciated that more than one barb 88 can be proximate each of the fingers 66 for engaging the tube 22.

The retainer 62 also has a stud 90 extending from the base 64 along the axis A beyond the barb 88 to engage the seal 52 for biasing the retainer 62 away from the housing 24 along the axis A to facilitate movement of the finger 66 against the engagement surface 28 and engagement of the barb 88 for retaining the tube 22. The stud 90 extends away from the base 64 to a distal surface 92 engaging the seal 52, and more specifically the distal surface 92 engages the second side 56 of the seal 52. The stud 90 tapers toward the distal surface 92. The taper of the stud 90 decreases a surface area of the distal end 76 for allowing the stud 90 to compress the second side 56 of the seal 52 a predetermined distance toward the shoulder 50. This compression, allows the retainer 62 to move back and forth between the first abutment 34 and the second abutment 36. The stud 90 is further defined as a plurality of studs 90 spaced from each other with each of the studs 90 disposed between a pair of the fingers 66. As such, the fingers 66 and the barbs 88 move without interfering with the studs 90 for ensuring the biasing of the seal 52 is distributed evenly relative to the fingers 66 and the barbs 88.

During assembly of the retainer 62 within the female port 26, the fingers 66 engage the entrance ramp 44. More specifically, the distal end 76 engages and rides up the entrance ramp 44. Upon completion of insertion, the fingers 66 disengage the entrance ramp 44 and are disposed within the windows 32.

Figure 11:
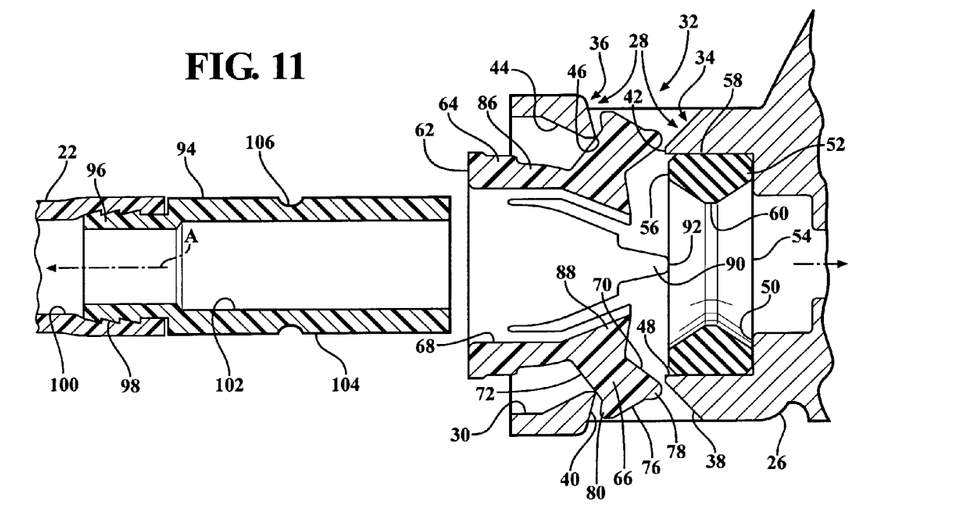
FIG. 11 is a partially exploded fragmented cross-sectional view of an alternative embodiment of the device including a plastic insert disposed in the tube.
Figure 12:
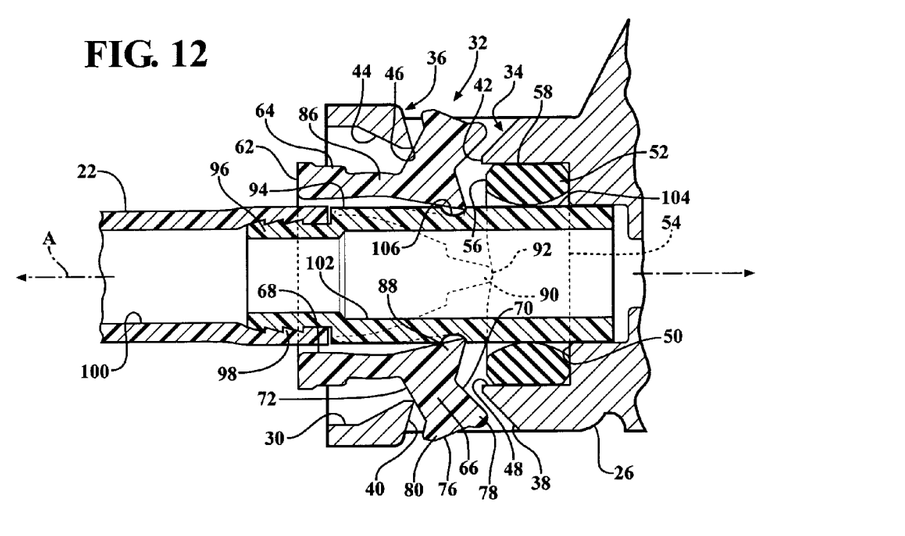
FIG. 12 is a cross-sectional view of the female port, the retainer, the seal, the tube the insert with the insert defining a notch and the barb receiving the notch when in the locked position.

In an alternative embodiment, as shown in FIGS. 11 and 12, the device 20 provides an audible feedback as discussed further below. As such, the device 20 further includes a plastic insert 94 having a projection 96 along the axis A for securing to the tube 22. The projection 96 further includes teeth 98. The tube 22 includes an interior surface 100 with the teeth 98 engaging the interior surface 100 for coupling the plastic insert 94 to the tube 22. The plastic insert 94 further defines a passage 102 along the axis A for transporting the fluid with the plastic insert 94 being at least partially disposed in both the aperture 68 of the retainer 62 and the hole 60 of the seal 52. The plastic insert 94 includes an exterior surface 104 defining at least one notch 106 for receiving the barb 88 to create an audible feedback when in the locked position.

The subject invention also discloses a method of selectively coupling the tube 22 to the device 20 having the housing 24 and the female port 26 extending from the housing 24 along the axis A with the female port 26 defining the first abutment 34 and the second abutment 36. The retainer 62 is disposed within the female port 26 having the base 64, the stud 90, the finger 66 having the front or first side 70 and the back or second side 72, and the barb 88. The seal 52 is also disposed within the female port 26. The method includes the steps of moving the retainer 62 toward the housing 24 along the axis A to the unlocked position and engaging the front or first side 70 of the finger 66 with the first abutment 34 when in the unlocked position as shown in FIG. 7. The method further includes the steps of engaging the stud 90 with the seal 52 to bias the retainer 62 away from the housing 24 and inserting the tube 22 through the retainer 62 and the seal 52 as well as moving the retainer 62 away from the housing 24 along the axis A to a locked position and engaging the barb 88 with the tube 22 to secure the tube 22 in the retainer 62 as shown in FIGS. 7 and 8. Furthermore, the method includes the steps of biasing the retainer 62 away from the housing 24 when in the locked position through the engagement of the stud 90 with the seal 52, and engaging the back or second side 72 of the finger 66 with the second abutment 36 when in the locked position to maintain engagement of the barb 88 with the tube 22. In one embodiment, the steps of inserting the tube 22 and moving the retainer 62 toward the housing 24 are performed simultaneously.

Figures 9, 10:
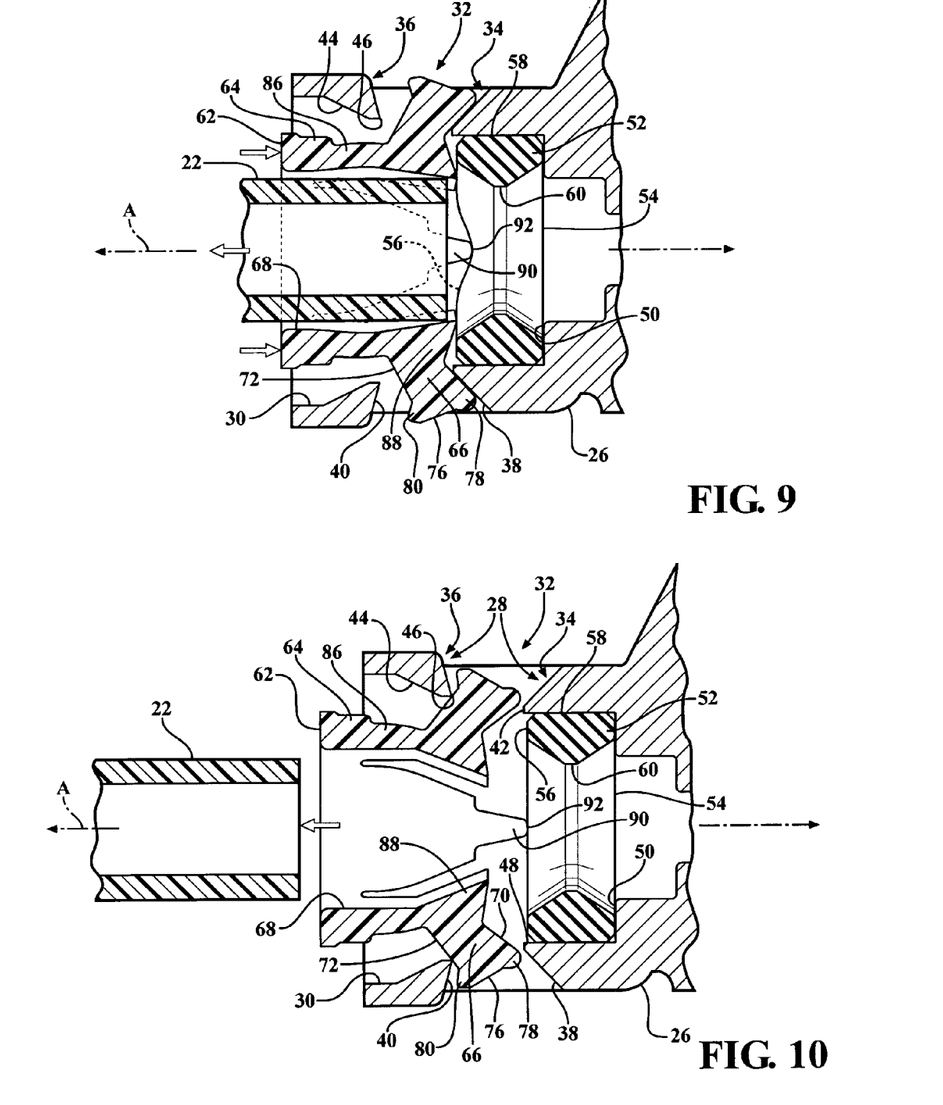
FIG. 9 is a cross-sectional view of the female port, the retainer, the seal and the tube with the finger engaging the first abutment, the barb disengaged from the tube and the retainer compressing the seal in the unlocked position.
FIG. 10 is a cross-sectional view of the female port, the retainer, the seal and the tube with the tube removed from the female port and the retainer returning to the locked position.

To remove the tube 22 from the device 20, the method includes the steps of moving the retainer 62 toward the housing 24 along the axis A to the unlocked position after the tube 22 has been inserted as shown in FIG. 9. The method further includes the steps of engaging the front or first side 70 of the finger 66 with the first abutment 34 when in the unlocked position and moving the barb 88 out of engagement with the tube 22 as well as removing the tube 22 from the retainer 62 and the seal 52 while maintaining the retainer 62 in the unlocked position as shown in FIGS. 9 and 10.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A device for receiving or providing a fluid with a tube coupled to said device for receiving or providing the fluid, said device comprising:
   a housing;
   a female port extending from said housing along an axis with said female port having a engagement surface and defining an interior chamber;
   a retainer disposed in said interior chamber of said female port and movable along said axis between a locked position and an unlocked position, with said retainer having a base, a finger extending from said base to selectively engage said engagement surface, and a barb proximate to said finger for selectively retaining the tube; and a seal disposed in said interior chamber of said female port adjacent said retainer, said seal having a first side and a second side spaced from said first side along said axis with said first side in continuous engagement with said female port;

said retainer having a stud extending from said base independent of said finger along said axis beyond said barb to engage said second side of said seal to continuously bias said retainer away from said housing along said axis to facilitate movement of said finger against said engagement surface and engagement of said barb when in said locked position for retaining the tube; and said finger including a front side and a back side spaced from each other along said axis and said engagement surface having at least one abutment, with said back side engaging said abutment when in said locked position.

2. A device as set forth in claim 1 wherein said front side engages said engagement surface when in said unlocked position.

3. A device as set forth in claim 2 wherein said at least one abutment is further defined as a first abutment and a second abutment spaced from each other with said front side engaging said first abutment when in said unlocked position and said back side engaging said second abutment when in said locked position.

4. A device as set forth in claim 3 wherein said barb is integrally formed with said finger such that said barb moves away from said axis when said front side of said finger engages said first abutment for allowing removal of the tube and said barb moves toward said axis when said back side of said finger engages said second abutment for securing the tube in said retainer.

5. A device as set forth in claim 3 wherein said first abutment includes as a first ramp with said front side of said finger engaging said first ramp in said unlocked position.

6. A device as set forth in claim 3 wherein said second abutment includes a second ramp with said back side of said finger engaging at least an end of said second ramp in said locked position.

7. A device as set forth in claim 6 wherein said female port includes an entrance ramp adjacent to said second ramp with said entrance ramp sloping inwardly towards said axis.

8. A device as set forth in claim 1 wherein said female port defines a window disposed radially relative to said axis for receiving said finger with said engagement surface defining said window.

9. A device as set forth in claim 8 wherein said window is further defined as a plurality of windows spaced from each other and said finger is further defined as a plurality of fingers spaced from each other with said fingers disposed in respective windows.

10. A device as set forth in claim 9 wherein said barb is further defined as a plurality of barbs spaced from each other with each of said barbs proximate to respective fingers.

11. A device as set forth in claim 10 wherein each of said barbs are integrally formed on respective fingers.

12. A device as set forth in claim 9, wherein said stud is further defined as a plurality of studs spaced from each other with each of said studs disposed between a pair of said fingers.

13. A device as set forth in claim 1 wherein said seal defines a hole through said first and second sides along said axis for receiving the tube and said retainer defines an aperture extending through said base along said axis for receiving the tube.

14. A device as set forth in claim 13 further including a plastic insert having a projection along said axis for securing to the tube.

15. A device as set forth in claim 14 wherein said plastic insert further defines a passage along said axis for transporting the fluid with said plastic insert being at least partially disposed in both said aperture of said retainer and said hole of said seal.

16. A device as set forth in claim 14 wherein said plastic insert includes an exterior surface defining at least one notch for receiving said barb to create an audible feedback.

17. A device as set forth in claim 1 wherein said retainer further includes a living hinge disposed between said base and said finger for allowing said finger to move radially relative to said axis.

18. A device as set forth in claim 1 wherein said finger extends to a distal end having a first lobe and a second lobe spaced from each other with at least one of said lobes selectively engaging said engagement surface.

19. A method of selectively coupling a tube to a device having a housing and a female port extending from the housing along an axis with the female port having an engagement surface which has a first abutment and a second abutment, a retainer disposed in an interior chamber of the female port and having a base, a stud, a finger having a front side and a back side spaced from each other, and a barb, and a seal having a first side and a second side spaced from the first side along the axis; the method comprising the steps of:

continuously engaging the first side of the seal with the female port;

engaging the stud, that extends from the base independent of the finger along the axis beyond the barb, with the seal to bias the retainer away from the housing along the axis;

inserting the tube through the retainer and the seal;

moving the retainer away from the housing along the axis to a locked position;

engaging the barb with the tube to secure the tube in the retainer;

continuously biasing the retainer away from the housing along the axis when in the locked position through the engagement of the stud with the seal, and;

engaging the back side of the finger with the second abutment when in the locked position to maintain engagement of the barb with the tube.

20. The method as set forth in claim 19 further including the steps of moving the retainer toward the housing along the axis to an unlocked position, and engaging the front side of the finger with the first abutment when in the unlocked position.

21. The method as set forth in claim 20 wherein the steps of inserting the tube and moving the retainer toward the housing are performed simultaneously.

22. The method as set forth in claim 20 further including the steps of:

moving the retainer toward the housing along the axis to the unlocked position after the tube has been inserted;

engaging the first side of the finger with the first abutment when in the unlocked position;

moving the barb out of engagement with the tube;

removing the tube from the retainer and the seal while maintaining the retainer in the unlocked position.

* * * * *